United States Patent Office 2,761,752
Patented Sept. 4, 1956

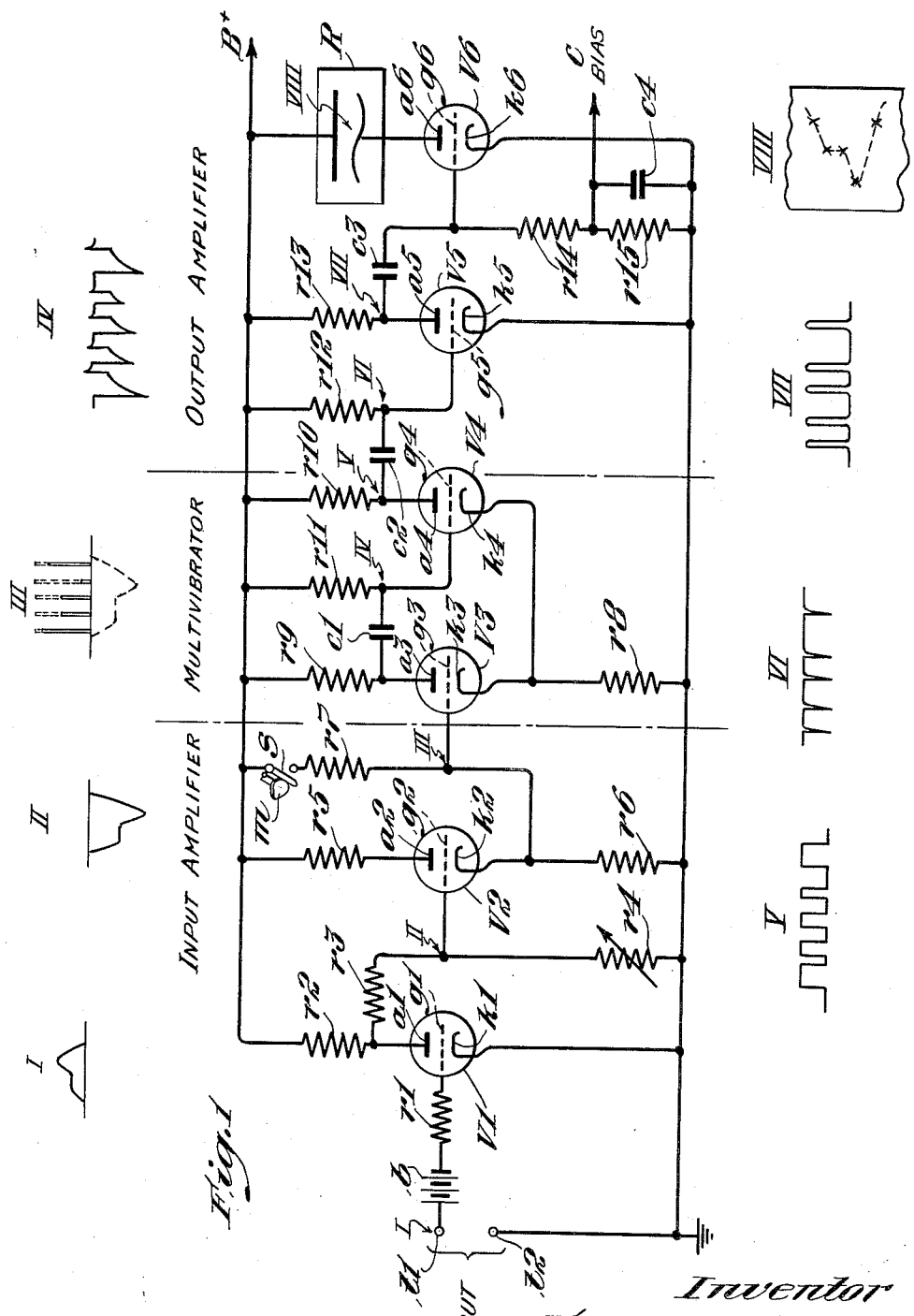

2,761,752

ELECTRICAL SIGNAL RECORDING

Edward D. Cross, West Bridgewater, Mass., assignor to Alden Products Co., Brockton, Mass., a corporation of Massachusetts Application September 14, 1951, Serial No. 246,629

10 Claims. (Cl. 346—33)

This invention relates to a method and apparatus for recording electrical signals.

Objects of this invention are to provide a method and apparatus for performing such method including a conventional recorder as is used for facsimile reception, to record variations of a characteristic of an input signal as a series of points forming a substantially continuous curve, which is simple in construction, which requires a minimum of conventional electronic circuit components, which is stable in operation and relatively free from the effects of temperature variations, which requires a minimum of operating adjustments and which advances the art generally.

In a broad aspect the invention contemplates the method of recording a varying characteristic such as the amplitude of electrical input energy by means of apparatus, for example such as a recorder having a stylus or a rotary helix and printer bar electrodes for continuously tracing a series of substantially parallel lines transversely to the direction of travel of the strip or web whereupon the recording takes place, which method comprises the steps of selecting one or more input pulses, translating the amplitude or other characteristic property of the pulses into the terms of duration of auxiliary pulses, and impressing on the recorder a further series of pulses which are shifted chronometrically proportionally to the pulse duration with respect to a reference signal chronometrically defined by the apparatus whereby the apparatus records the characteristic property of the input energy.

In a more specific aspect the input signal is divided into a plurality of input pulses that preserve the amplitude of the input signal and whose frequency is in synchronism with the speed of rotation of the moving electrode of a recorder. The amplitude of the respective pulses is translated into terms of duration of auxiliary pulses one end of each of which is in synchronous relationship with respect to the rotational speed of the electrode. The other end of each auxiliary pulse is shifted in phase an amount proportional to the amplitude of the corresponding input pulse. Further pulses are fed to the recording apparatus which are simultaneous with the phase shifted ends of the auxiliary pulses whereby the apparatus records the signal amplitude in terms of marks relatively shifted in the direction of the lines or traces continuously made by the apparatus upon the web or other recording medium.

In another aspect the invention contemplates apparatus for reproducing an input signal of varying amplitude comprising a recorder having two electrodes such as a conducting helix and a printer bar, which helix is rotated relatively to the other electrode to make successive traces across a web of recording material, and means which operate in synchronism with the rotary helix of the recorder for dividing the input signal into a series of pulses having an amplitude that varies as a function of the amplitude of the input signal. The pulses are translated by further means into auxiliary pulses whose durations are a function of the respective input pulses. Still further means are provided for feeding to the electrodes of the recorder additional pulses whose relative chronological positions are a function of the duration of the auxiliary pulses so that the relative locations of the resulting marks transversely of the web are proportional to the amplitude of the input signal.

In a more specific aspect the apparatus comprises a one kick multivibrator including two vacuum tubes whose respective control electrodes are so biased that the first tube is normally cut off and the second tube is normally conducting. A capacitor interconnects the control electrode of the conducting tube with the anode of the cut off tube. The control electrode of the cut off tube is connected to the cathode follower of an input signal amplifier to impress a negative potential upon the tube which varies directly with the amplitude of the input signal. A series of positive pulses are simultaneously applied to the same control electrode by switching means which are operated in synchronism with the movable helix so that the anode potential of the normally conducting tube varies as a series of positive auxiliary pulses whose durations are a function of the difference between the input signal potential and the respective positive potential pulses upon the tube control electrode. The output from the multivibrator is applied by means of a capacitor to the first stage tube of an output amplifier which is biased so that the tube is normally conducting. The second stage tube is biased so that it is normally cut off, whereby the trailing edge of each auxiliary pulse applies a relatively negative potential to the control electrode of the first stage tube to cut off the flow of current through the tube. The bias upon the second stage tube thereupon becomes more positive so that the tube conducts to send further current pulses through the electrodes of the recorder which are connected in series with the tube.

Further objects relate to various features of construction and will be apparent from a consideration of the following description and accompanying wiring diagram in the figure of the drawing.

The embodiment of the invention chosen for the purpose of illustration comprises two input terminals $t1$ and $t2$ the latter of which is connected to ground. The terminal $t1$ is connected to the control electrode $g1$ of a first stage vacuum tube V1 of an input signal amplifier by means of a coupling resistor $r1$ and a "C" battery $b$ for supplying a biasing potential through the electrode. The tube cathode $k1$ is grounded. The anode $a1$ of the tube V1 is supplied with a direct operating potential by means of a resistor $r2$ which connects with a regulated "B" power supply of conventional design (not shown). The anode $a1$ is also connected to the control electrode $g2$ of a second stage amplifier tube V2 by means of a coupling resistor $r3$. The gain of the tube V2 is adjustable by means of a potentiometer $r4$ which is connected between the tube control electrode $g2$ and ground. The direct potential from the "B" supply is furnished to the anode $a2$ through a resistor $r5$. Bias for the control electrode $g2$ is supplied by means of a cathode resistor $r6$ which is connected between the tube cathode $k2$ and ground.

This cathode resistor $r6$ also acts as a cathode follower a connection being made between the common terminal of the cathode resistor $r6$ and the cathode $k2$ and the control electrode $g3$ of the first vacuum tube V3 of a one kick multivibrator. Successive positive potential pulses from the "B" power supply are applied to the control electrode $g3$ by means of a current limiting resistor $r7$ and a switch S having contacts operated by a cam $m$ driven in synchronism with the rotatory helical electrode of a conventional facsimile recorder R which is preferably but not necessarily similar to the recorder shown in the copending application of Milton Alden Serial No. 136,512, filed January 3, 1950. The cathode $k3$ of the vacuum tube V3 and the cathode $k4$ of a second vacuum tube V4 of the multivibrator are connected to ground by a common cathode biasing resistor $r8$. The anodes $a3$ and $a4$ of the tubes V3 and V4 are connected to the "B" power supply by means of the resistors $r9$ and $r10$ respectively. The control electrode $g4$ of the vacuum tube V4 is connected to the anode of the vacuum tube V3 by means of a coupling capacitor $c1$. A positive bias is supplied to the control electrode $g4$ of the tube V4 by means of a resistor $r11$ which is connected to the "B" power supply so that the tube V4 is normally conducting in the absence of a negative input signal.

The anode $a4$ is also connected with the control electrode $g5$ of a first stage vacuum tube V5 of an output amplifier by means of a coupling capacitor $c2$. The cathode $k5$ of the tube V5 is connected directly to ground, a positive bias being supplied to the tube by means of a resistor $r12$ which is connected to the "B" supply so that the tube is normally conducting. The anode $a5$ of the tube V5 has impressed thereupon a direct potential from the "B" power supply by means of a resistor $r13$. The anode $a5$ is also connected with the control electrode $g6$ of a vacuum tube V6 which forms the last or "printing" stage of the output amplifier.

The last stage tube V6 is biased to cut off by means of a potential from an external "C" supply which is preferably although not necessarily supplied from a center tap of the main power transformer of the "B" supply. The biasing potential is applied to the control electrode $g6$ by a voltage divider consisting of the resistors $r14$ and $r15$. A large capacitor (e. g. 20 mfd.) is connected across the resistor $r15$ as a filter when the biasing potential is obtained from the "B" power supply. The cathode $k6$ is connected directly to ground. The anode $a6$ is connected to the "B" power supply through the electrodes of the recorder "R."

The operation of the above described circuit can best be understood with reference to the diagrams which represent voltages taken at various points in the circuit with respect to ground plotted as a function of time. These diagrams are distinguished by Roman numerals which are correlated with similar numerals upon the wiring diagram to indicate the points in the circuit which are correlated with the respective voltage-time diagrams. For purposes of illustration an input signal wave form such as shown in diagram I is assumed to be applied to the input terminals $t1$ and $t2$ and therefore to the control electrode $g1$ of the first stage amplifier tube V1. As is shown in diagram II this wave form is amplified and reversed in phase by the conventional operation of the tube V1 as an amplifier, the amplified wave form next being applied to the control electrode $g2$ of the tube V2 which comprises the second stage of the input amplifier. The potential on the electrode $g2$ and therefore the gain of the tube V2 is controlled by suitable adjustment of the potentiometer $r4$.

The output of the second stage tube V2 is taken from the cathode follower resistor $r6$ and applied to the control electrode $g3$ of the first tube V3 of the multivibrator. The potential drop across the resistor $r6$ is shown in diagram III as the dotted wave form below the ordinate line. Simultaneously positive pulses of direct potential from the "B" power supply are periodically applied to the control electrode $g3$ by the closing of the contacts of the switch S. As was described heretofore the cam $m$ operating the switch S is operated in synchronism with the rotation of the drum carrying the helical electrode, the period of each pulse cycle corresponding to one revolution of the drum. These positive potential pulses are shown as dotted square waves above the ordinate line of diagram III. The above opposing potentials result in a series of positive pulses being impressed upon the control electrode $g3$ whose amplitudes are determined by the algebraic sum of the negative amplitude of the input signal from the amplifier and the amplitude of the positive pulses i. e., the net potential impressed upon the control electrode $g3$ is a series of positive voltage pulses having an amplitude which is a function of the strength or amplitude of the input signal.

The resultant pulses shown in the diagram III are applied to the electrode $g3$ of the tube V3 which in the absence of an input signal is cut off by the potential drop across the cathode biasing resistor $r8$ resulting from the current flowing through the normally conducting tube V4 of the multivibrator. When each of the above mentioned resulting pulses is impressed upon the control electrode $g3$, the corresponding flow of current through the tube V3 causes the voltage from the anode $a3$ to ground to decrease. The voltage of the control electrode $g4$ to ground decreases an equal amount because of the coupling action of the capacitor $c1$ so that the potential drop across the cathode resistor $r8$ also decreases. The decrease in the potential drop across the resistor $r8$ raises the voltage of the control electrode $g3$ with respect to the cathode $k3$ resulting in an increase in the current through V3. The above operation cuts off the normally conducting tube V4 which remains in this cut off condition while the capacitor $c1$ discharges until the potential upon the control electrode $g4$ reaches the cut off point whereupon current again begins to flow through the tube V4. This results in a second switching operation as the current through the cathode resistor $r8$ raises the cathode voltage sufficiently so that the tube V3 cuts off the high potential upon the anode $a3$ of the tube V3 helping to make the tube V4 conducting.

It will be apparent from the above that the greater the potential upon the control electrode $g3$ the greater will be the charge in the capacitor $c1$ and therefore the longer the period required for it to discharge to the potential of the control electrode $g4$ at which the tube V4 is no longer cut off. The negative potential pulses upon the electrode $g4$ resulting from the discharge of the capacitor $c1$ are illustrated in diagram IV. The resulting potential changes upon the anode $a4$ of the tube V4 are shown in diagram designated V which illustrates that with the lack of an input signal, the tube V4 is normally conducting, as described heretofore, so that the potential of the anode $a4$ is below that of the "B" supply by an amount equal to the voltage drop across the resistor $r10$. When the tube V4 is cut off the potential at the anode $a4$ immediately rises to substantially that of the "B" supply. Upon the resumption of the flow of current through the tube V4 after the discharge of the capacitor $c1$ the anode voltage again drops to its original value so that the potential rises and falls as auxiliary pulses having a duration or period dependent upon the length of time required for the discharge of a capacitor $c1$ as described heretofore. It will be apparent that this period is a function of the amplitude of the positive input pulse impressed upon the control electrode $g3$. As the initiation of the auxiliary pulses is determined by the closing of the cam operated switch S, the relative positions chronologically of the trailing edges of the auxiliary pulses are also a function of the amplitude of the input pulses in diagram III.

As described heretofore the first stage tube in the output amplifier is normally conducting because of the positive potential from the "B" supply normally impressed upon its control electrode $g5$ by the resistor $r12$. As the anode of the tube V4 is connected to the control electrode by means of a coupling capacitor $c2$ during the normal constant current flow through the tube V4 no potential is impressed upon the control electrode $g5$. The rise in anode potential to a potential substantially equal to that of the "B" power supply due to operation of the multivibrator as described above, likewise has no effect on the control electrode $g5$ because such electrode is already at the power supply potential because of the resistor $r12$. Upon the drop of the anode potential of the tube V4 at the end of an auxiliary pulse, however the control electrode $g5$ has impressed thereupon a short negative pulse such as shown in diagram VI. The time constant of the circuit including the capacitor $c2$ and the resistor $r12$ is made very short so that these pulses are very peaked, causing the tube V5 to be cut off only momentarily. It will be recognized that the chronological relation between these further pulses of diagram VI is determined by the chronological relationship of the trailing edges of the auxiliary pulses upon the anode a4 which in turn depended upon the amplitude of the input pulses applied to the control electrode g3 as was described in detail above. The cutting off of the tube V5 results in a momentary rise of its anode potential to that of the "B" power supply as is shown in diagram VII. The positive potential appearing at the anode a5 is applied to the control electrode g6 of the tube V6 by the capacitor c3 so that this tube conducts sending a pulse of current through the electrodes of the recorder R. This flow of current causes a mark such as shown in diagram VIII to appear on the web of recording material traveling through the recorder which as successive marks are made traces out the original curve of the input signal such as shown in diagram I because of the synchronism of the speed of the recorder with respect to the position of the pulses.

It should be understood that the present disclosure is for the purpose of illustration only and that this invention includes all modifications and equivalents which fall within the scope of the appended claims.

I claim:

1. Apparatus for reproducing an input signal of varying amplitude comprising a recorder for marking a web of recording material traveling between electrodes, one of which moves relatively to the other electrode to make successive traces transversely of the direction of travel of the web, means operated in synchronism with the movable electrode for dividing the signal into a series of input pulses having an amplitude which is a function of the amplitude of the input signal, means for translating the pulses into auxiliary pulses whose durations are a function of the amplitude of the respective input pulses, means for converting the auxiliary pulses into further pulses whose relative chronological positions are a function of the durations of the respective auxiliary pulses, and means for feeding to the electrodes of the recorder said further pulses so that the relative locations of the resulting marks transversely of the web are proportional to the amplitude of the input signal.

2. Apparatus for reproducing an input signal of varying amplitude comprising a recorder for marking a web of recording material traveling between electrodes in the form of a bar and a movable helix, switching means operated in synchronism with the movable helix for dividing the signal into a series of input pulses having an amplitude which is a function of the amplitude of the input signal, means for translating the pulses into auxiliary pulses whose durations are a function of the amplitude of the respective input pulses, means for converting the auxiliary pulses into further pulses whose relative chronological positions are a function of the durations of the respective auxiliary pulses, and means for feeding to the electrodes of the recorder said further pulses so that the relative locations of the resulting marks transversely of the web are proportional to the amplitude of the input signal.

3. Apparatus for reproducing an input signal of varying amplitude comprising a recorder for marking a web of recording material traveling between electrodes in the form of a bar and a movable helix, switching means operated in synchronism with the movable helix for dividing the signal into a series of input pulses having an amplitude which is a function of the amplitude of the input signal, a multivibrator having output terminals and input terminals connected with said switch means for translating the pulses into auxiliary pulses whose durations are a function of the respective input pulses, means for converting the auxiliary pulses into further pulses whose relative chronological positions are a function of the durations of the respective auxiliary pulses, and means connected with the output terminals for feeding to the electrodes of the recorder said further pulses so that the relative locations of the resulting marks transversely of the web are proportional to the amplitude of the input signal.

4. Apparatus for reproducing an input signal of varying amplitude comprising a recorder for marking a web of recording material traveling between electrodes in the form of a bar and a movable helix; a one kick multibrator including a vacuum tube having a cathode, an anode and a control electrode biased so that the tube is normally cut off, a second vacuum tube having a cathode, an anode and a control electrode biased so that the second vacuum tube is normally conducting, and a capacitor interconnecting the control electrode of the second tube and the anode of the first tube; means for applying the input signal to the control electrode of the first tube as a negative potential; switching means operated in synchronim with the movable helix for periodically applying a series of potential pulses positive to the control electrode of first tube so that the anode potential of the second tube varies as a series of auxiliary pulses whose durations are a function of the difference between the amplitudes of the negative input signal potential and the respective positive potential pulses; means for converting the auxiliary pulses into further pulses whose relative chronological positions are a function of the durations of the respective auxiliary pulses, and means for feeding to the electrodes of the recorder said further pulses so that the relative locations of the resulting marks transversely of the web are proportional to the amplitude of the input signal.

5. Apparatus for reproducing an input signal of varying amplitude comprising a recorder for marking a web of recording material traveling between electrodes in the form of a bar and a movable helix; a one kick multivibrator including a vacuum tube having a cathode, an anode and a control electrode biased so that the tube is normally cut off, a second vacuum tube having a cathode, an anode and a control electrode biased so that the second vacuum tube is normally conducting, and a capacitor interconnecting the control electrode of the second tube and the anode of the first tube; an input signal amplifier whose last stage has a cathode follower for applying the input signal to the control electrode of the first tube as a negative potential; switching means operated in synchronism with the movable helix for periodically applying a series of positive potential pulses to the control electrode of the first tube so that the anode potential of the second tube varies as a series of auxiliary pulses whose durations are a function of the difference between the amplitudes of the negative input signal potential and the respective positive potential pulses; means for converting the auxiliary pulses into further pulses whose relative chronological positions are a function of the durations of the respective auxiliary pulses, and means for feeding to the electrodes of the recorder said further pulses so that the relative locations of the resulting marks transversely of the web are proportional to the amplitude of the input signal.

6. Apparatus for reproducing an input signal of varying amplitude comprising a recorder for marking a web of recording material traveling between electrodes in the form of a bar and a movable helix, switching means operated in synchronism with the movable helix for dividing the signal into a series of input pulses having amplitudes which are a function of the amplitude of the input signal, means for translating the input pulses into auxiliary pulses whose durations are a function of the amplitudes of the respective input pulses, means for converting the auxiliary pulses into further pulses whose relative chronological positions are a function of the durations of the respective auxiliary pulses, and an amplifier normally biased to cut off having input terminals connected so that said auxiliary pulses are impressed thereupon and output terminals connected to the electrodes of said recorder to feed thereto said further pulses so that the relative locations of the resulting marks transversely of the web are proportional to the amplitude of the input signal.

7. Apparatus for reproducing an input signal of varying amplitude comprising a recorder for marking a web of recording material traveling between electrodes in the form of a bar and a movable helix; switching means operated in synchronism with the movable helix for dividing the signal into a series of input pulses having amplitudes which are a function of the amplitude of the input signal; means for translating the pulses into auxiliary positive pulses whose durations are a function of the amplitudes of the respective input pulses, an amplifier including a first vacuum tube having an anode and a control electrode biased so that the tube is normally conducting, a second vacuum tube having an anode, a cathode and a control electrode connected to the anode of the first vacuum tube, the bias upon the control electrode of the second tube being such that the tube is normally cut off; and a capacitor connecting the control electrode of the first tube with the auxiliary pulse means whereby the trailing edge of each auxiliary pulse applies a relatively negative potential to the control electrode of the first tube to cut off the tube so as to convert the auxiliary pulse into a further pulse whose relative chronological position is a function of the duration of the respective auxiliary pulse, the bias upon the second tube thereupon becoming more positive so that the tube conducts; the anode of the second tube being connected with the electrodes of the recorder to feed to the electrodes, said further pulses so that the relative locations of the resulting marks transversely of the web are proportional to the amplitude of the input signal.

8. Apparatus for reproducing an input signal of varying amplitude comprising a recorder for marking a web of recording material traveling between electrodes in the form of a bar and a movable helix; a one kick multivibrator including a vacuum tube having a cathode, an anode and a control electrode biased so that the tube is normally cut off, a second vacuum tube having a cathode, an anode and a control electrode biased so that the second vacuum tube is normally conducting, and a capacitor interconnecting the control electrode of the second tube and the anode of the first tube; means for applying the input signal to the control electrode as a negative potential; switching means operated in synchronism with the movable helix for periodically applying a series of positive potential pulses to the control electrode of the first tube so that the anode potential of the second tube varies as a series of positive auxiliary pulses whose durations are a function of the difference between the negative input signal potential and the respective positive pulses upon the control electrode pulses; an output amplifier including a first stage vacuum tube having an anode and a control electrode biased so that the tube is normally coducting, a second stage vacuum tube having an anode, a control electrode connected to the anode of the first stage tube, the bias upon the control electrode of the second stage tube being such that the tube is normally cut off; and a capacitor connecting the control electrode of the first stage tube of the output amplifier to the anode of the second tube of the multivibrator whereby the trailing edge of each positive auxiliary pulse applies a relatively negative potential to the control electrode of the first stage tube to cut off the tube so as to convert the auxiliary pulse into a further pulse whose relative chronological position is a function of the duration of the respective auxiliary pulse, the bias upon the second stage tube thereupon becoming more positive so that the tube conducts; the anode of the second stage tube being connected with the electrodes of the recorder to feed to the electrodes said further pulses so that the relative locations of the resulting marks transversely of the web are proportional to the amplitude of the input signal.

9. Apparatus for reproducing an input signal of varying amplitude comprising a recorder for marking a web of recording material traveling between electrodes in the form of a bar and a movable helix; a one kick multivibrator including a vacuum tube having a cathode, an anode and a control electrode biased so that the tube is normally cut off, a second vacuum tube having a cathode, an anode and a control electrode biased so that the second vacuum tube is normally conducting, and a capacitor interconnecting the control electrode of the second tube and the anode of the first tube; an input signal amplifier whose last stage has a cathode follower for applying the input signal to the control electrode of the first tube as a negative potential; switching means operated in synchronism with the movable helix for periodically applying a series of positive potential pulses to the control electrode of the first tube so that the anode potential of the second tube varies as a series of positive auxiliary pulses whose durations are a function of the difference between the negative input signal potential and the respective positive pulses upon the control electrode; an output amplifier including a first stage vacuum tube having an anode and a control electrode biased so that the tube is normally conducting, a second stage vacuum tube having an anode, a cathode and a control electrode connected to the anode of the first stage tube, the bias upon the control electrode of the second stage tube being such that the tube is normally cut off; and a capacitor connecting the control electrode of the first stage tube of the output amplifier to the anode of the second tube of the multivibrator whereby the trailing edge of each positive auxiliary pulse applies a relatively negative potential to the control electrode of the first stage tube to cut off the tube so as to convert the auxiliary pulse into a further pulse whose relative chronological position is a function of the duration of the respective auxiliary pulse, the bias upon the second stage tube thereupon becoming more positive so that the tube conducts; the anode and cathode of the second stage tube being connected in series with the electrodes of the recorder to feed to the electrodes said further pulses so that the relative locations of the resulting marks transversely of the web are proportional to the amplitude of the input signal.

10. Apparatus for reproducing an input signal of varying amplitude comprising input signal means, means for feeding a web of recording material along a predetermined path, scanning means for marking successive traces on a web transversely of the direction of travel of the web, means synchronized with said scanning means for generating a series of input pulses in synchronism with the marking of said traces including means responsive to said generating means and input means to vary the amplitude of said input pulses according to the amplitude of said input signal, means for translating the input pulses into auxiliary pulses whose durations are a function of the amplitude of the respective input pulses, means for converting the auxiliary pulses into further pulses whose relative chronological positions are a function of the durations of the respective auxiliary pulses, and means for applying said further pulses to said scanning means so that the relative locations of the resulting marks transversely of the web are proportional to the amplitude of the input signal.

References Cited in the file of this patent

UNITED STATES PATENTS

| | | |
|---|---|---|
| 1,843,572 | MacGahan | Feb. 2, 1932 |
| 2,206,929 | Turnbull et al. | July 9, 1940 |
| 2,232,829 | Ross | Feb. 25, 1941 |
| 2,412,310 | Young | Dec. 10, 1946 |
| 2,428,021 | Grieg | Sept. 30, 1947 |
| 2,496,392 | Hasbrook | Feb. 7, 1950 |
| 2,532,631 | Loria et al. | Dec. 5, 1950 |